: US 9,047,793 B2
(45) Date of Patent: Jun. 2, 2015

(12) United States Patent
Yoshida et al.

(54) THREE DIMENSIONAL VIDEO DISPLAY DEVICE

(75) Inventors: Hidefumi Yoshida, Osaka (JP); Tsuyoshi Maeda, Osaka (JP); Satoshi Shibata, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 573 days.

(21) Appl. No.: 13/501,365

(22) PCT Filed: Oct. 15, 2010

(86) PCT No.: PCT/JP2010/068188
§ 371 (c)(1),
(2), (4) Date: Apr. 11, 2012

(87) PCT Pub. No.: WO2011/049025
PCT Pub. Date: Apr. 28, 2011

(65) Prior Publication Data
US 2012/0200681 A1    Aug. 9, 2012

(30) Foreign Application Priority Data
Oct. 20, 2009   (JP) ................................. 2009-241335

(51) Int. Cl.
*H04N 13/04* (2006.01)
*G06T 15/00* (2011.01)
(Continued)

(52) U.S. Cl.
CPC ............ *G09F 19/12* (2013.01); *G02B 27/2214* (2013.01); *G09F 9/33* (2013.01);
(Continued)

(58) Field of Classification Search
CPC .. G02B 27/2214; G09F 9/37; H04N 13/0434; G09G 1/00; G09G 2230/00; G09G 2290/00
USPC ............................................ 348/55; 345/419
See application file for complete search history.

(56) References Cited

U.S. PATENT DOCUMENTS 5,502,481 A    3/1996   Dentinger et al.
6,836,286 B1  12/2004   Tachi et al.
(Continued)

FOREIGN PATENT DOCUMENTS

CN    1873768 A    12/2006
JP    10-97013     4/1998
(Continued)

OTHER PUBLICATIONS

International Search Report for PCT/JP2010/068188 mailed Nov. 16, 2010.
(Continued)

*Primary Examiner* — Dave Czekaj
*Assistant Examiner* — Tsion B Owens
(74) *Attorney, Agent, or Firm* — Nixon & Vanderhye, P.C.

(57) ABSTRACT

In a three dimensional video display device (1), an LED unit (10) rotates in the direction of the arrow (24) along top and bottom edges of a display section (28). The LED unit (10) has a left-eye LED array (6) and a right-eye LED array (8), each including plural LEDs (4) aligned in a column. The left-eye LED array (6) displays a left-eye image through an afterimage effect produced by displaying, while rotating, columns of pixel groups constituting the left-eye image. The right-eye LED array 8 displays a right-eye image through an afterimage effect produced by displaying, while rotating, columns of pixel groups constituting the right-eye image. Light from the left-eye image enters the left eye of a viewer, whereas light from the right-eye image enters the right eye. The viewer recognizes a three dimensional image in a range of 360° around the viewer based on binocular parallax.

6 Claims, 11 Drawing Sheets

(51) Int. Cl.
  *G09F 19/12* (2006.01)
  *G02B 27/22* (2006.01)
  *G09F 9/33* (2006.01)
  *G09F 9/37* (2006.01)
  *G02B 27/26* (2006.01)
  *G09F 13/18* (2006.01)

(52) U.S. Cl.
  CPC ........... *G09F 9/37* (2013.01); *G09F 2013/189* (2013.01); *H04N 13/0434* (2013.01); *H04N 13/0438* (2013.01); *G02B 27/26* (2013.01); *H04N 13/0459* (2013.01)

(56) References Cited

U.S. PATENT DOCUMENTS

| | | | |
|---|---|---|---|
| 2004/0125044 A1 | 7/2004 | Suzuki | |
| 2005/0073577 A1 | 4/2005 | Sudo et al. | |
| 2007/0086090 A1* | 4/2007 | Wang et al. | 359/464 |
| 2010/0066818 A1* | 3/2010 | Goto | 348/52 |

FOREIGN PATENT DOCUMENTS

| | | |
|---|---|---|
| JP | 10-327431 | 12/1998 |
| JP | 2001-42260 | 2/2001 |
| JP | 2002-62506 | 2/2002 |
| JP | 2002-271820 | 9/2002 |
| JP | 2004-40667 | 2/2004 |
| JP | 2005-99064 | 4/2005 |
| JP | 2005-295325 | 10/2005 |
| JP | 2005-326803 | 11/2005 |
| JP | 2006-94458 | 4/2006 |
| JP | 2006-349774 | 12/2006 |
| JP | 2008-287262 | 11/2008 |

OTHER PUBLICATIONS

Written Opinion of the International Searching Authority mailed Nov. 16, 2010 (Foreign language).

Chinese Office Action and English translation there mailed Nov. 13, 2014 in Chinese Application 201080046668.X.

* cited by examiner

THREE DIMENSIONAL VIDEO DISPLAY DEVICE

This application is the U.S. national phase of International Application No. PCT/JP2010/068188 filed 15 Oct. 2010 which designated the U.S. and claims priority to JP 2009-241335 filed 20 Oct. 2009, the entire contents of each of which are hereby incorporated by reference.

TECHNICAL FIELD

The present invention relates to a three dimensional video display device, and especially to a three dimensional video display device that uses an afterimage effect produced by rotating a light emitting element.

BACKGROUND ART

In recent years, because of significant progress of image displaying technologies, there has been developed a technology for displaying three dimensional images, in addition to a technology for displaying two dimensional images. The technology for displaying three dimensional images can be used in a remarkably wide range of fields, such as entertainments, medical fields, and electronic catalogs/advertisements.

As a technology for displaying three dimensional images, a polarized glasses method is known. When employing this method, a right-eye image and a left-eye image are displayed alternately at every single dot line on a display screen, and linearly polarizing filters are provided in front of the images. In so doing, the linearly polarizing filter for a left-eye image is provided in front of the left-eye image, and the linearly polarizing filter for a right-eye image is provided in front of the right-eye image, whereby light of the left-eye image and light of the right-eye image are converted by the respective linearly polarizing filters into linearly polarized lights whose polarizations are orthogonal to each other. Then, prepared are polarized glasses configured such that a polarizing plate having a polarization axis for the left-eye image is attached to a left-eye lens, and that a polarizing plate having a polarization axis for the right-eye image is attached to a right-eye lens. When a viewer wearing the polarized glasses views the displayed images, the left eye receives only the left-eye image, and the right eye receives only the right-eye image. This causes the left eye to perceive only the left-eye image, and causes the right eye to perceive only the right-eye image, whereby the viewer recognizes a three dimensional image.

While the polarized glasses method mentioned above requires a viewer to wear polarized glasses, technologies for displaying a three dimensional image without requiring polarized glasses have been developed in recent years. One of those technologies is a parallax barrier method. When employing this method, a right-eye image and a left-eye image are displayed alternately at every single dot line on a display screen, and a parallax barrier with slits made at predetermined intervals therein is positioned in front of the images. When a viewer views the displayed images, the parallax barrier blocks the right-eye image from being visible to the left eye, and blocks the left-eye image from being visible to the right eye. This causes the left eye to perceive only the left-eye image, and causes the right eye to perceive only the right-eye image, whereby the viewer recognizes a three dimensional image.

Alternatively, a lenticular lens method is also a technology for displaying a three dimensional image without requiring polarized glasses. When employing this method, a right-eye image and a left-eye image are displayed alternately at every single dot line on a display screen, and a lenticular lens is provided in front of the images. When a viewer views the displayed images, only the left-eye image enters the left eye, and only the right-eye image enters the right eye by the effect of the lenticular lens. This causes the left eye to perceive only the left-eye image, and causes the right eye to perceive only the right-eye image, whereby the viewer recognizes a three dimensional image.

These three methods mentioned above use binocular parallax to enable a viewer to perceive a displayed image three-dimensionally. Having said that, since all of these methods make use of a flat screen, displaying a three dimensional image on a curved surface is not possible. In order to deal with this problem, technologies for displaying a three dimensional image on a curved surface are disclosed in Patent Literatures 1-3.

Patent Literature 1 discloses such a configuration that a three dimensional video display device, which is configured such that a plurality of columns of LEDs (light emitting diode) are aligned on the circumference of the device, is rotated so as to induce an afterimage effect. The three dimensional video display device is rotated at an appropriate rotation speed, and appropriate display signals are sent to individual LEDs in sync with the rotation speed. Each LED is provided with a slit, and beams of light emitted from the plurality of LEDs are radiated out of the slits with a predetermined pitch angle for creating parallax. Then, the beams of light from the plurality of LEDs enter the eyes of a viewer respectively, and the viewer recognizes, by the effect of binocular parallax, a colored three dimensional image in spaces in front of and behind display units. It should be noted that, by moving around the three dimensional video display device, the viewer can view the three dimensional image from all around the substantially cylindrical three dimensional video display device.

Patent Literature 2 discloses a technology for displaying a three dimensional image by using a screen that rotates at high speed. When employing the technology disclosed in the present Patent Literature, there are prepared in advance slide images viewing the center of a display target from a plurality of viewing points provided, at regular intervals, on a proper circumference surrounding the display target at the center thereof. Then, the slide images are projected in series on a fast rotating screen by using reflecting mirrors. By continuously repeating this process, an afterimage effect on naked eyes is induced, whereby the eyes recognize a three dimensional image of the display target on the screen. This technology disclosed in the present Patent Literature is also applicable to projection of moving images.

Patent Literature 3 discloses a three dimensional video display device that has rotatable display plates including LED units positioned in spirals and that has, on the back sides of the display plates, a screen reflecting an image projected from an image projector. Each of the plurality of LED units emits light and stops to emit light in correspondence with a three dimensional image to be displayed as the display plate rotates. This makes it possible to view, by an afterimage effect, the three dimensional image in a light emitting displayable area in front of the display plate. Then, the background of the three dimensional image displayed in the light emitting displayable area is projected from the image projector on the screen. This allows the image displayed by the rotation of the display plates and the background image on the screen to be viewed while both images are overlapping each other. The technology disclosed in the present Patent Literature makes it possible to display, by using a display created by light emission and a display created by image projection together, a realistic three dimensional image constituted by a combination of still images and moving images.

A technology disclosed in Patent Literature 4 exercises ingenuity that renders even a higher degree of realistic sensation. The present Patent Literature discloses such a configuration that image data indicative of an image surrounding a viewer is split into segments that are displayed on a plurality of display devices positioned around the viewer. Each display device produces and displays such an image as to be viewed when the viewer views toward the display device. This allows the viewer to receive, from each of the display devices, an image of a virtual-space surrounding the viewer, whereby the viewer can experience a high degree of realistic sensation and immersion as if the viewer were in fact present in the midst of the three dimensional virtual-reality space.

CITATION LIST

Patent Literature 1
Japanese Patent Application Publication, Tokukaihei, No. 10-97013 A (Publication Date: Apr. 14, 1998)
Patent Literature 2
Japanese Patent Application Publication, Tokukai, No. 2002-271820 A (Publication Date: Sep. 20, 2002)
Patent Literature 3
Japanese Patent Application Publication, Tokukai, No. 2006-349774 A (Publication Date: Dec. 28, 2006)
Patent Literature 4
Japanese Patent Application Publication, Tokukai, No. 2005-99064 A (Publication Date: Apr. 14, 2005)

SUMMARY OF INVENTION

Technical Problem

The above technologies disclosed in Patent Literatures 1-3 have the advantage of being able to display three dimensional images on a curved surface. However, since all of the technologies aim for public viewing and use a cylindrical device that displays images to be viewed from outside of the device, it is hard to say that the images to be viewed by a viewer are three dimensional images that render a realistic sensation as if the viewer were actually present in the midst of the space of the three dimensional images.

Especially, the three dimensional display device disclosed in Patent Literature 1 is small in size, and therefore is not suitable for displaying realistic three dimensional images.

Furthermore, in the technology disclosed in Patent Literature 2, images displayed as three dimensional images are floating images. Therefore, in order to render a high degree of realistic sensation, it is necessary to display background images apart from the three dimensional images. Since the three dimensional images and the background images are displayed separately, realistic sensation is inevitably lacking in this technology.

Likewise, the technology disclosed in Patent Literature 3 requires displaying, at the back side of the light emitting displayable area where a three-dimensional image is shown, a three-dimensional background image on the screen. Therefore, since the three dimensional image is the combination of still images and moving images, it is hard to say that the three dimensional image provides a high degree of realistic sensation.

On the other hand, the technology disclosed in Patent Literature 4 displays image data in such a manner as to surround a viewer, enabling the viewer to experience as if the viewer were in fact present in the three dimensional virtual-reality space. However, the technology disclosed in the present Patent Literature uses two dimensional image data. Therefore, while it is possible, with this technology, to demonstrate a virtual space surrounding the viewer, realistic sensation is still lacking.

The present invention is designed in view of the problems mentioned above, and its object is to provide a three dimensional video display device that can display highly realistic three dimensional images.

Solution to Problem

In order to solve the foregoing problem, a three dimensional video display device according to the present invention is a three dimensional video display device for displaying a three dimensional image constituted by a left-eye image and a right-eye image, including: a left-eye image display section for displaying, one by one at fixed intervals, a plurality of left-eye pixel columns constituting the left-eye image, at positions which correspond to displayed ones of the plurality of left-eye pixel columns and which are away by a predetermined distance from a predetermined central axis; and a right-eye image display section for displaying, one by one at fixed intervals, a plurality of right-eye pixel columns constituting the right-eye image, at positions which correspond to displayed ones of the plurality of right-eye pixel columns and which are away by the predetermined distance from the predetermined central axis.

With the above configuration, a plurality of left-eye pixel columns and a plurality of right-eye pixel columns are displayed one by one at fixed intervals around the central axis towards the central axis. This enables the pixel columns to produce an afterimage effect so as to display a left-eye image and a right-eye image, respectively. As a consequence, a three dimensional image constituted by these two images is displayed around the central axis. At this point, the left-eye image is incident to the left eye of a viewer, and the right-eye image is incident to the right eye of the viewer, whereby the viewer views the three dimensional image. Thus, the three dimensional image can be viewed in all directions around the viewer.

As described above, the present invention makes it possible to display a highly realistic three dimensional image.

Additional objects, features, and strengths of the present invention will be made clear by the description below. Further, the advantages of the present invention will be evident from the following explanation in reference to the drawings.

Advantageous Effects of Invention

In the three dimensional video display device according to the present invention, a viewer is all surrounded by a three dimensional image. This gives the viewer an illusory sensation as if the viewer were in fact present in the space of the displayed image. Hence, the viewer experiences a highly realistic sensation and deep immersion.

DESCRIPTION OF EMBODIMENTS

Embodiment 1

(Summary of Three Dimensional Video Display Device 1)

Figure 1:
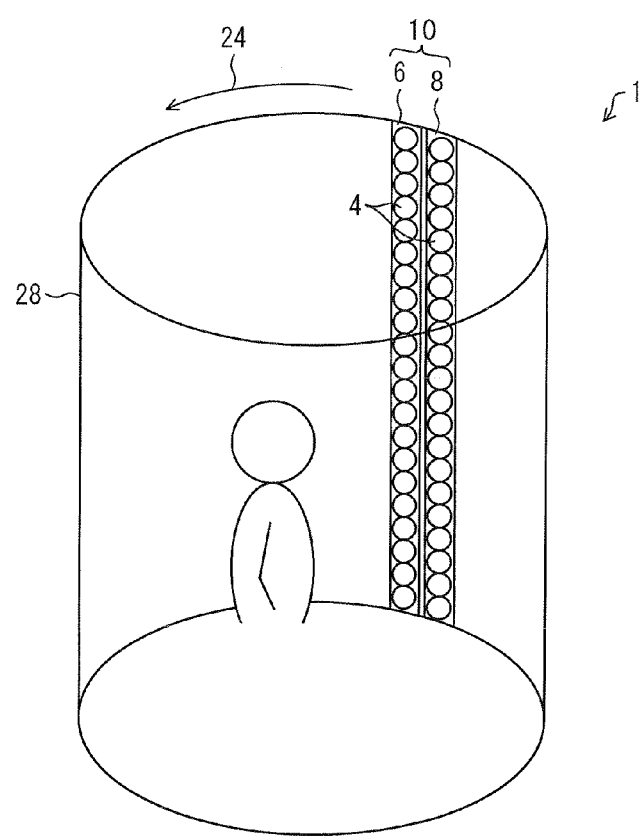
FIG. 1 is a view schematically showing a three dimensional display device in accordance with one embodiment of the present invention.

A summary of a three dimensional video display device 1 according to the present embodiment is described with reference to FIG. 1. FIG. 1 is a view showing a configuration of a three dimensional video display device 1 according to the present embodiment.

As shown in FIG. 1, the three dimensional video display device 1 according to the present embodiment includes (i) LED units 10 (display unit) each constituted by a left-eye LED array 6 (left-eye image display section) and a right-eye LED array 8 (right-eye image display section) and (ii) a display section 28. The display section 28 has a cylindrical shape, and is positioned in such a manner as to center on a predetermined central axis which is not illustrated. Also, the display section 28 has, along top and bottom edges thereof, rotation mechanisms that rotate the LED units 10 in a circumferential direction around the central axis (the direction of an arrow 24).

The LED units 10 are positioned so as to have light emitting surfaces thereof face the inside (towards the central axis) of the cylindrical display section 28. In this way, the LED units 10 emit light towards the inside of the display section 28 while rotating. As a result, an afterimage effect is induced so as to display a three dimensional image on an inner side face of the display section 28. A viewer gets inside the display section 28 to view the image.

Each of the LED units 10 has two units each constituted by a plurality of vertically aligned LEDs 4 (display element). One of these two units is the left-eye LED array 6 that displays a left-eye image, and the other is the right-eye LED array 8 that displays a right-eye image. The left-eye image and the right-eye image are displayed simultaneously to form a three dimensional image.

Light emitted from the left-eye LED array 6 is incident only to the left eye of the viewer, whereas light emitted from the right-eye LED array 8 is incident only to the right eye of the viewer (the configuration is described in detail later). Therefore, the left eye recognizes only the left-eye image, and the right eye recognizes only the right-eye image so as to create binocular parallax, whereby the viewer views a three dimensional image on the side face of the display section 28.

(Configuration of LED Unit 10)

Figure 2:
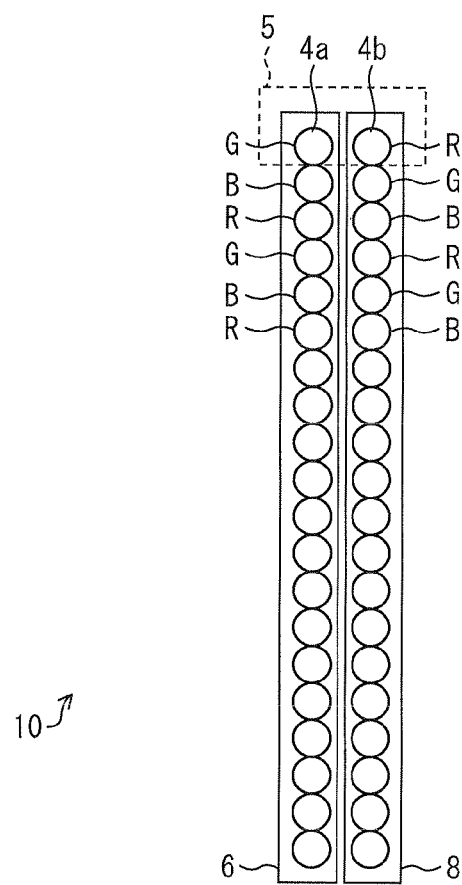
FIG. 2 is a close-up view showing an LED array in accordance with one embodiment of the present invention.

The configuration of each LED unit 10 is described in detail with reference to FIG. 2. FIG. 2 is a close-up view showing the LED unit 10. As mentioned above, one of the two units constituting the LED unit 10 is the left-eye LED array 6, and the other is the right-eye LED array 8. The left-eye LED array 6 is constituted by a plurality of left-eye LEDs 4a aligned in a column, and displays a left-eye image. On the other hand, the right-eye LED array 8 is constituted by a plurality of right-eye LEDs 4b aligned in a column, and displays a right-eye image. Both arrays are positioned adjacently to each other so as to constitute the LED unit 10.

Each of the LEDs 4 (left-eye LEDs 4a, right-eye LEDs 4b) emits light that is one of red (R), green (G), and blue (B). The LEDs 4 of R, G, and B are aligned in a predetermined order as a set, and each of the LED units (left-eye LED array 6 and right-eye LED array 8) is constituted by aligning plural sets of the LEDs 4 in a column. In so doing, it is desirable to make difference in the order of aligning the LEDs 4 of R, G, and B between the left-eye LED array 6 and the right-eye LED array 8. For example, if the left-eye LEDs 4a are aligned in the order of G, B, and R in the left-eye LED array 6, then the right-eye LEDs 4b are to be aligned in the order of R, G, and B in the right-eye LED array 8. This configuration prevents the occurrence of horizontal emission lines that is caused by pixels of the same color being displayed.

In the present embodiment, each LED unit 10 measures 10 mm in a horizontal direction and 3 m in a vertical direction. In this case, the LEDs 4 are aligned at 0.8 mm intervals lengthwise, and are spaced away by 1.25 mm from adjacent LEDs 4 widthwise. It should be noted that these values are merely an example, and are not to limit the technical scope of the present invention.

Figure 3:
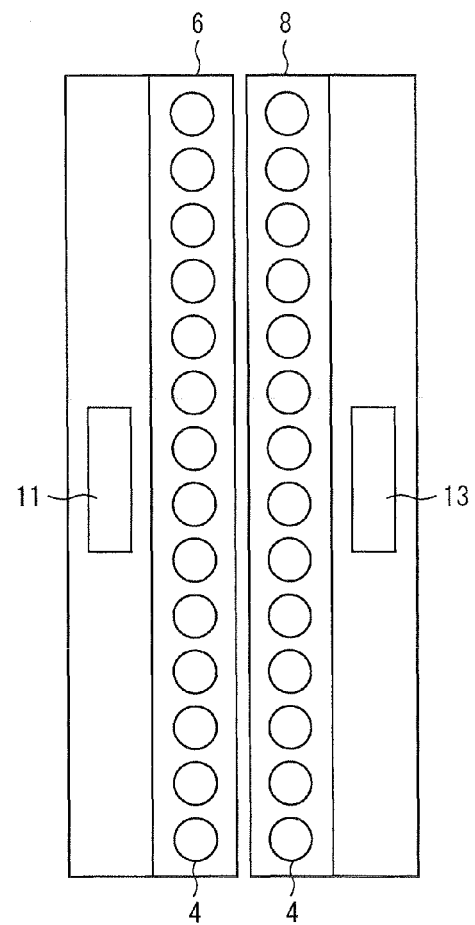
FIG. 3 is a view schematically showing an LED array with drivers provided.

The LED units 10 can be easily operated by using predetermined drivers. This is described with reference to FIG. 3. FIG. 3 is a view schematically showing the LED unit 10 with the operating drivers provided.

As shown in FIG. 3, an operating driver 11 is provided for the left-eye LED array 6, and an operating driver 13 is provided for the right-eye LED array 8. Each driver is provided either on the backside or on the side face of each LED unit 10 in consideration of the rotation of the LED unit 10 and of image display of the LED unit 10. In this way, by individually operating the LED units 10 by one of the driver 11 and 13, it is possible for the LED units 10 to display desired images.

Since the LED units 10 can be operated easily as described above, the LED units 10 are used to display images in the present embodiment. Alternatively, it is quite possible to use display elements such as liquid crystal, PDP (plasma display panel) elements, inorganic EL (electroluminescence) elements, and organic EL elements. Especially, in the case of using organic EL elements, the characteristic of the organic EL elements such as fast response speed becomes quite effective.

As shown in FIG. 2, the above describes the case of using the LED unit 10 in which the left-eye LED array 6 and the right-eye LED array 8 are aligned side by side. Nevertheless, both LED arrays do not necessarily have to be aligned side by side (adjacent to each other). That is, alternatively, the left-eye LEDs 4a and the right-eye LEDs 4b may be lined alternately in a column of an LED array (a plurality of LEDs lined in a column).

Additionally, in the examples above, an image is displayed while limiting viewable pixels to certain ones with respect to a range of angles at the left side and a range of angles at the right side, respectively, thereby realizing a three dimensional image viewable within a certain viewing range (viewing angles). However, it is possible to enlarge the range (angles) within which a three dimensional image can be viewed. Specifically, a displayed image can be made viewable from a variety of viewpoints by displaying an image while limiting viewable pixels to certain ones with respect to plural ranges of angles at the left side and plural ranges of angles at the right side, respectively. For example, the range (viewing angles) within which a three dimensional image can be viewed can be enlarged by displaying an image while changing displayed images with respect to every 20° at the left side and the right side.

(Method for Rotating LED Units 10)

As described above, the three dimensional video display device 1 displays a three dimensional image on the display section 28 by rotating the LED units 10 at high speed. The following is a specific description of the method for rotating the LED units 10.

In the three dimensional video display device 1, at least one LED unit 10 should be rotated along the top and bottom edges of the display section 28. However, in order to keep the weight balance evenly during the rotation, it is preferable to rotate two sets or more of the LED 10 units at the same time. In so doing, two of the LED units 10 in a set are positioned in such a manner as to face each other, and individual LED units 10 are positioned at regular intervals. Described below is the method, in the case where the three dimensional video display device 1 has four LED units 10 therein, for rotating the LED units 10.

Figure 4:
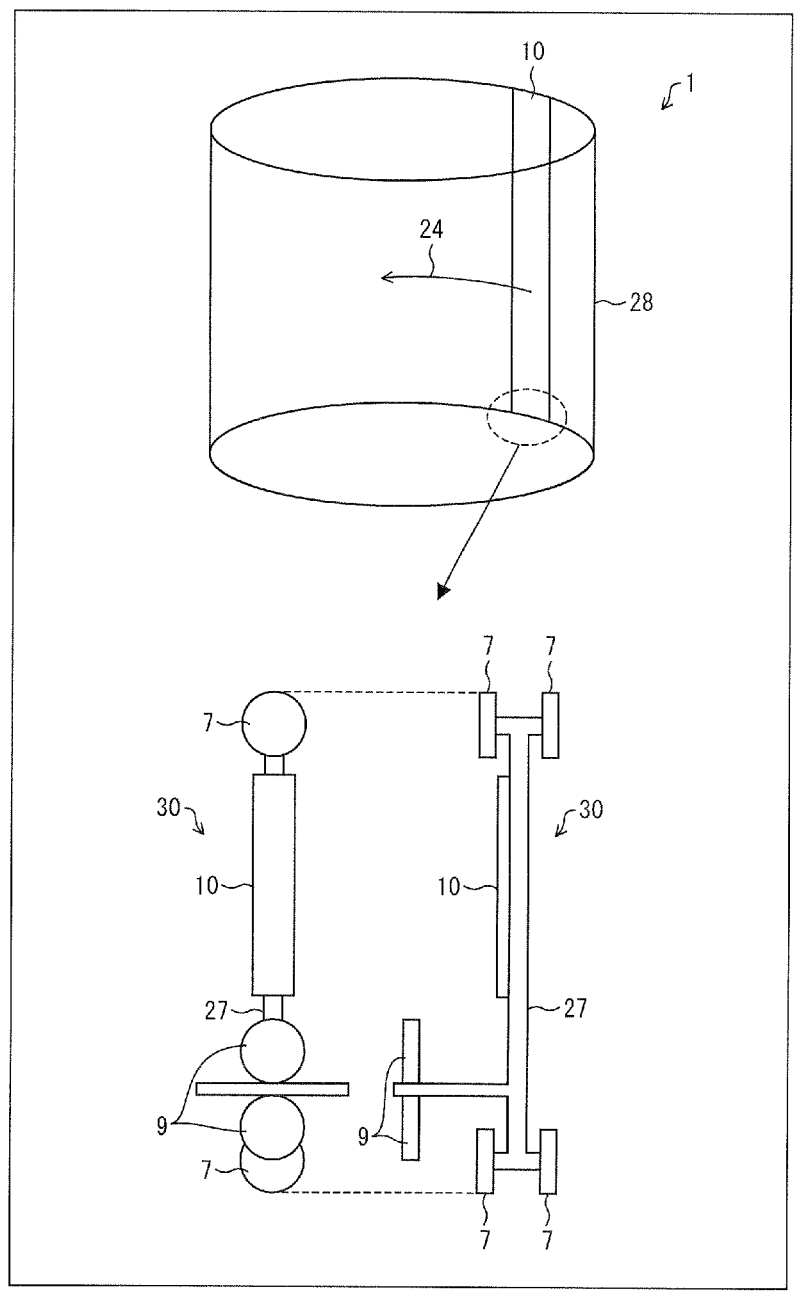
FIG. 4 is a view showing the configuration of a rotation mechanism for rotating LED arrays.

First, a mechanism for rotating the LED units 10 is described below with reference to FIG. 4. FIG. 4 is a view showing a rotation mechanism 30 for rotating the LED units 10.

The LED units 10 rotate along the top and bottom edges of the cylindrical display section 28. In this case, since a viewer views a three dimensional image from within the cylinder, it is presumed that the viewer mainly stands at the center of the cylinder. Hence, it is desirable not to provide an axis of rotation of the LED units 10 at the center of the cylinder in order to avoid obstructing the viewer.

Thus, in the present embodiment, as shown in FIG. 4, there is used the rotation mechanism 30 configured such that a support plate 27 is provided on the outer circumference of a flat donut-shaped ring, the support plate 27 supporting the LED units 10 in such a manner that the LED units 10 are normal to the ring. The display section 28 is equipped with a plurality of pairs of wheels 9 at the lower parts within the cylinder which parts are closer to the inner side face of the cylinder, and each pair of wheels 9 holds the edge of the inner circumference of the ring therebetween. The wheels 9 are configured to rotate, and the rotation is controlled by a control device, which is not illustrated. It should be noted that the wheels 9 in a pair rotate inversely to each other. However, of individual pairs of wheels 9, the wheels 9 holding the top side of the ring rotate all in the same rotating direction. That is, the wheels 9 holding the bottom side of the ring rotate all in the same rotating direction as well.

The rotation mechanism 30 is rotated by the force of friction generated when these wheels 9 are rotated. Since a pair of wheels 7 is provided both at the top and bottom of the support plate 27, the rotation mechanism 30 can rotate smoothly. It should be noted that, since the LED units 10 are rotated along the outer circumference of the top and bottom edges of the display section 28, the outer diameter of the rotation mechanism 30 is approximately the same as the diameter of the display section 28.

Besides, although the above described the configuration of the display section 28 having a cylindrical shape, the display section 28 is not necessarily limited to this configuration. For example, instead of using the cylindrical display section 28, a display section having a quadrilateral tube shape such as square and rectangle can be used. An example of the configuration of a three dimensional video display device provided with a display section having a quadrilateral tub shape is shown in FIG. 5.

Figure 5:
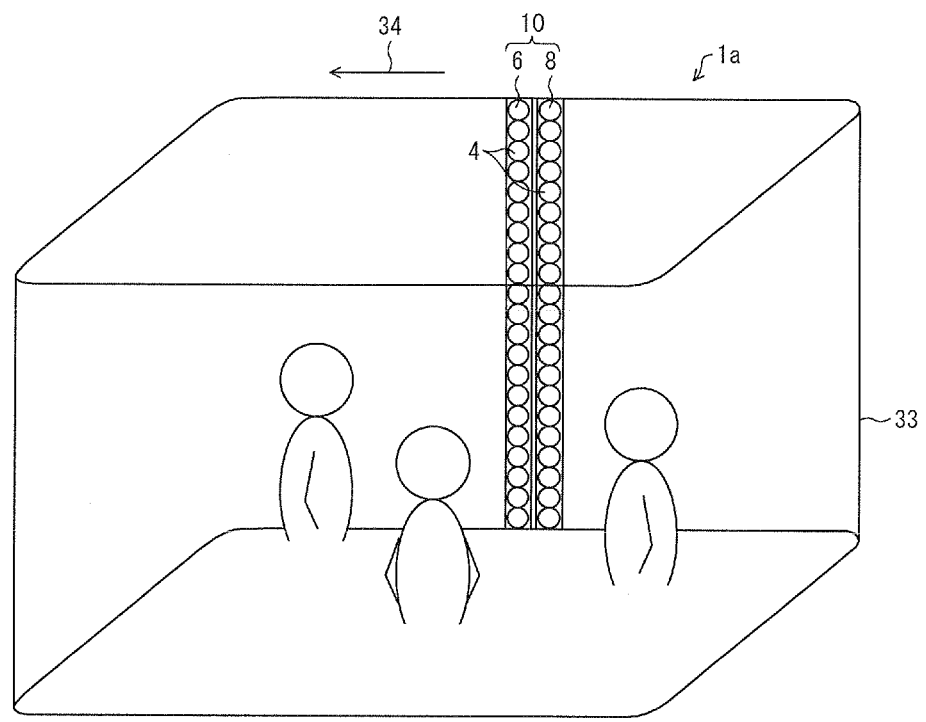
FIG. 5 is a view schematically showing a three dimensional video display device in accordance with one embodiment of the present invention.

As shown in FIG. 5, the three dimensional video display device of the present invention may be a three dimensional video display device 1a including a display section 33 having a quadrilateral tube shape instead of the cylindrical display section 28. Then, by rotating the LED units 10 along the top and bottom edges of the display section 33 (the direction of an arrow 34) with the rotation mechanism 30, a three dimensional image is displayed on the inner side face of the display section 33. A viewer views the image from within the display section 33. The number of viewers is not limited to one, and there can be more than one viewer.

As long as the rotation mechanism 30 can be rotated as described above, the display sections 28 and 33 can have any forms. Therefore, the three dimensional video display device 1 according to the present embodiment can suitably use not only a display section having a cylindrical or quadrilateral tube shape but display section having a polygonal tube shape.

It should be noted that, since the display section 33 of the three dimensional video display device 1a has a quadrilateral tube shape, images at the four corners can be deformed or blurred. Thus, in order to prevent the deformation or blurring of the images, it is desirable to make, on the images displayed at the four corners, treatments such as performing image processing and image conversion, and adjusting the optical system etc.

Figure 6:
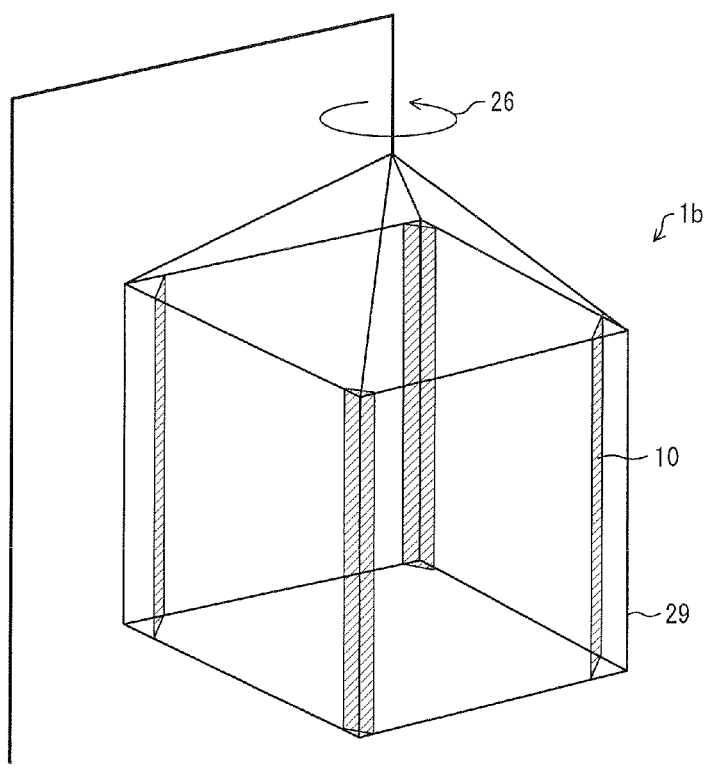
FIG. 6 is a view schematically showing a three dimensional video display device in accordance with one embodiment of the present invention.

Besides, it is also possible, instead of providing the rotation mechanism 30 as described above, to configure the display section 28 itself to rotate. A specific example is described with reference to FIG. 6. FIG. 6 is a view schematically showing a three dimensional video display device 1b.

As shown in FIG. 6, the three dimensional video display device 1b includes a hollow display section 29 (housing) having a quadratic prism shape. The LED units 10 are built into the four corners of the three dimensional video display device 1b respectively. By suspending the display section 29 in the air with the four top corners as anchor points and by rotating the display section 29 in the direction of an arrow 26 by a rotation mechanism (not illustrated), each of the LED units 10 can be rotated at fixed speed, as with the case of using the rotation mechanism 30. It should be noted that the rotation axis of the display section 29 should be equal to the central axis of the display section 29.

As described above, in order to keep the weight balance evenly during the rotation, in the case of using the plurality of LED units 10, it is desirable to position the LED units 10 at regular intervals between each other. Although the display section 29 having a quadratic prism shape is illustrated in the view, it is of no matter to use a display section having a cylindrical, elliptic, or spherical shape, as long as the display section has a central axis. The shape of the display section 29 is to be decided in consideration of the desired shape of a display surface. It should be noted that, since a viewer views images from within the display section 29, it is required to design the three dimensional video display device such that the bottom face of the display section 29 or the area where the viewer stands and sits is not to be rotated together with the display section 29.

(Afterimage Effect by Rotation of LED Units 10)

Normally, in the case of using a single LED unit 10, rotation of the LED unit 10 at 60 rounds or more per second prevents flickering. In consideration of this, when four LED units 10 are used, each of the LED units 10 should be rotated at 15 rounds or more per second. When focusing on a point on the circumference of the rotation, the rotation of each of the four LED units 10 at 15 rounds or more per second causes the LED units 10, as a whole, to pass (rotate) the point at 60 rounds or more per second in effect. By adjusting the starting point of the rotation and having each LED unit 10 emit and stop to emit with predetermined timing on the basis of the adjusted starting point, light appears to remain even after disappearing in reality. This is how an afterimage effect is induced, whereby a viewer perceives as if one image were produced as a whole. It is desirable that the inner surface of the display section 28 is opaque in order that, when the viewer views from within the display section 28, an object outside the three dimensional video display device 1 does not get in the viewer's sight through a three dimensional image displayed on the inner side surface of the cylinder. Especially if the inner surface of the display section 28 is colored black, the contrast between the color of light emitted from the LED units 10 and the color of outside of the LED units 10 becomes heightened, thereby making it easier to view the three dimensional image displayed.

(Displayed Image of Three Dimensional Video Display Device 1)

Figure 7:
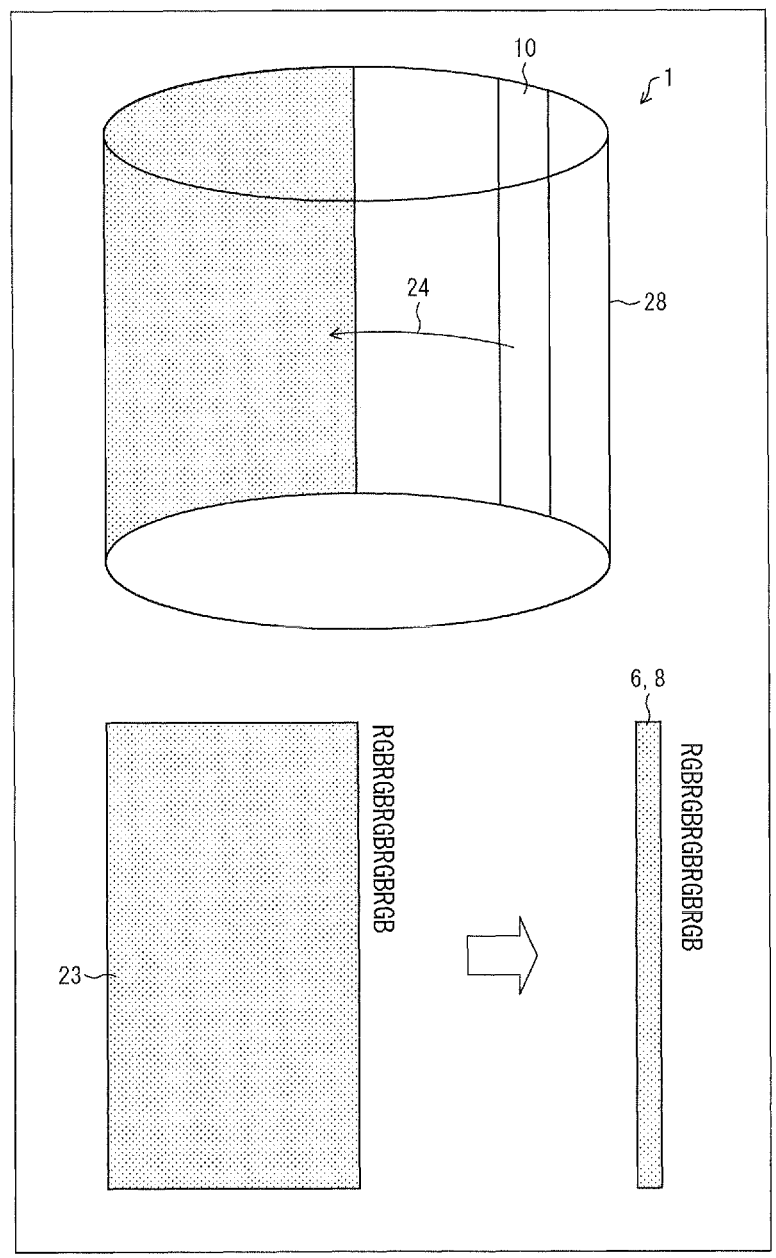
FIG. 7 is a view schematically showing an image to be displayed on LED arrays.

An image displayed by the three dimensional video display device 1 is described with reference to FIG. 7. FIG. 7 is a view schematically showing an image displayed on the LED unit 10.

When the radius of the display section 28 for rotating the LEDs is 1.5 m, the circumference is approximately 10 m. Thus, in the case of using four LED units, one LED unit passes through a length of 2.5 m (¼ of the circumference) in ⅟60 seconds. Further, when the resolution of the pixels is 2.5 mm (1.25 mm×2), the number of pixels of the three dimensional video display device 1 is 1000 (2.5 m/2.5 mm). In such a case, an FHD (full HD) image of 1920×1090 is provided as an image to be displayed by the three dimensional video display device 1. FHD is one of HDTV (high definition television) image modes and has 1080 or more scanning lines. If the length and the width of the FHD image are interchanged, the image becomes an FHD image of 1090×1920 as shown in FIG. 7. In the three dimensional video display device 1, since an image displayed when a single LED unit 10 rotates through ¼ of the whole circumference has 1000 pixels, using the FHD image as an image to be displayed by the three dimensional video display device 1 will accomplish its purpose. At this point, each of the LED units displays one dot line of the FHD image, that is, a pixel column consisting of 1920 pixels. It should be noted that, since pixels are normally arranged in the order of RGB on an FHD image, interchanging of the length and the width of the FHD image arranges the pixels vertically in the order of RGB. Because each of the LEDs 4 of the LED units is arranged in the same manner, the LEDs 4 can easily suit this configuration.

In the three dimensional video display device 1, the LED unit 10 has the left-eye LED array 6 and the right-eye LED array 8. The left-eye LED array 6 displays a left-eye image, and the right-eye LED array 8 displays a right-eye image. Therefore, both a left-eye FHD image and a right-eye FHD image are provided, and the left-eye FHD image is output to the left-eye LED array 6, and the right-eye FHD image is output to the right-eye LED array 8.

In direct-view-type three dimensional video display devices currently in use, a right-eye image is displayed on an odd row (1 dot line of odd rows) of an image, and a left-eye image is displayed on an even row (1 dot line of even rows) of the image. Since the three dimensional video display device 1 of the present embodiment displays an FHD image while interchanging the length and the width of the FHD image, it is possible to employ, by interchanging the length and the width of the image, the method currently used by conventional devices. Specifically, interchanging of the length and the width of the image arranges pixel columns each consisting of 1920 pixels. Therefore, it is possible to display a right-eye image on an odd pixel column, and to display a left-eye image on an even pixel column.

As described above, the three dimensional video display device 1 is a device that displays a three dimensional image consisting of a right-eye image and a left-eye image. The left-eye LED array 6 displays, one by one at fixed intervals toward a predetermined central axis, a plurality of left-eye pixel columns constituting the left-eye image, at positions which correspond to displayed ones of the left-eye pixel columns and which are away by a fixed distance from the predetermined central axis. On the other hand, the right-eye LED array 8 displays, one by one at fixed intervals toward the predetermined central axis, a plurality of right-eye pixel columns constituting the right-eye image, at positions which correspond to displayed ones of the right-eye pixel columns and which are away by a predetermined distance from the predetermined central axis.

With the above configuration of the three dimensional video display device 1, a plurality of right-eye pixel columns and a plurality of left-eye pixel columns are, one column a time respectively, displayed at the circumference of a predetermined central axis towards the central axis at fixed intervals. This causes each of the pixel columns to produce an afterimage effect, whereby a right-eye image and a left-eye image are displayed. As a result, a three dimensional image derived from these two images is displayed on the circumference of the central axis. The right-eye image is incident to the right eye of a viewer, and the left-eye image is incident to the left eye of the viewer, whereby the viewer recognizes the three dimensional image. Thus, the viewer can view the highly realistic three dimensional image all around the central axis.

(Technique for Displaying Three Dimensional Image)

Figure 8:
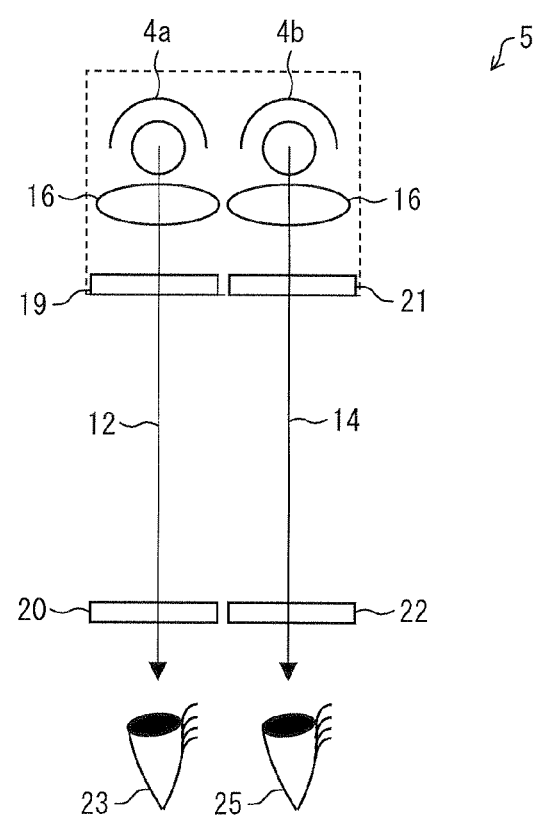
FIG. 8 is a view schematically showing a process in which light emitted from an LED pair is transmitted through polarized glasses and received by a viewer.

A technique for displaying, as a three dimensional image, light emitted from the LED units 10 is described in detail below with reference to FIG. 8. FIG. 8 is a view schematically showing the process in which light emitted from the left-eye LEDs 4a and from the right-eye LEDs 4b (LED pair 5) is received by a viewer via polarized glasses. The description is focused on an LED pair 5; a pair of a left-eye LED 4a and a right-eye LED 4b.

In the case of using polarized glasses, a circularly polarizing plate is provided in front of each of light converging lenses 16 shown in FIG. 8. More specifically, on a surface of the left-eye LED array 6 on which surface the left-eye LED 4a is formed, a left-handed circularly polarizing plate 19 is provided in front of the left-eye LED 4a with the light converging lens 16 therebetween. On the other hand, on a surface of the right-eye LED array 8 on which surface the right-eye LED 4b is formed, a right-handed circularly polarizing plate 21 is provided in front of the right-eye LED 4b with the light concentrating lens 16 therebetween. With this configuration, lights emitted from each LED pair 5 (left-eye LED 4a, right-eye LED 4b) are converged by light converging lenses 16, and transmitted through circularly polarizing plates respectively.

Light 12 emitted from the left-eye LED 4a is converted into left-handed circularly polarized light by a left-handed circularly polarizing plate 20, whereas light 14 emitted from the right-eye LED 4b is converted into right-handed circularly polarized light by a right-handed circularly polarizing plate 21. Then, prepared are polarized glasses configured such that a left-handed circularly polarizing plate is attached to the left lens, and a right-handed circularly polarizing plate is attached to the right lens. When a viewer wears the polarized glasses, a left eye 23 receives only the left-handed circularly polarized light emitted from the left-eye LED 4a, and a right eye 25 receives only the right-handed circularly polarized light emitted from the right-eye LED 4b. Thus, the left eye 23 perceives only a left-eye image, and the right eye 25 perceives only a right-eye image, whereby the viewer recognizes a three dimensional image.

At this point, instead of circularly polarizing plates, linearly polarizing filters can be used. Linearly polarizing filters for a left-eye image are provided in front of the left-eye LEDs 4a, and linearly polarizing filters for a right-eye image are provided in front of the right-eye LEDs 4b. Lights emitted from each LED pair 5 (left-eye LED 4a, right-eye LED 4b) are converted by the respective linearly polarizing filters into linearly polarized lights whose polarizations are orthogonal to each other. Then, prepared are polarized glasses configured such that a polarizing plate having a polarizing axis of the linearly polarized light from the left-eye LED 4a is attached to a left-eye lens, and a polarizing plate having a polarizing axis of the linearly polarized light from the right-eye LED 4b is attached to a right lens. When the viewer wears the polarized glasses, the left eye 23 receives only the linearly polarized light emitted from the left-eye LED 4a, and the right eye 25 receives only the linearly polarized light emitted from the right-eye LED 4b. Thus, the left eye 23 perceives only a left-eye image, and the right eye 25 perceives only a right-eye image, whereby the viewer recognizes a three dimensional image. Using such polarized glasses as described above makes it easy for a plurality of viewers to view a three dimensional image simultaneously.

Figure 9:
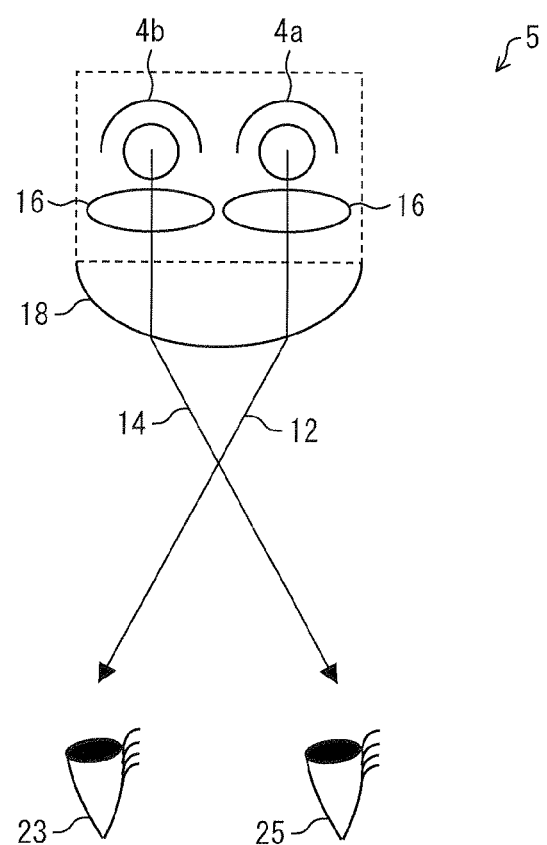
FIG. 9 is a view schematically showing a process in which light emitted from an LED pair is transmitted through a lenticular lens and received by a viewer.

The above explained examples of displaying three dimensional images by having a viewer wear polarized glasses. Alternatively, three dimensional images can be displayed by providing a lenticular lens on each of the LEDs 4. In this instance, a viewer is not required to wear polarized glasses. The following is a description of the detailed configuration with reference to FIG. 9. FIG. 9 is a view schematically showing the process in which light emitted from the left-eye LED 4a and the right-eye LED 4b (LED pair 5) is transmitted through a lenticular lens 18 and received by a viewer.

As described above, the LED unit 10 is constituted by a plurality of LEDs 4, and each LED 4 emits light towards inside of the display section 28. Since the light that is emitted from each LED 4 is generally an outgoing radiational type, light converging lenses 16 are positioned in front of each LED 4 on a surface of the LED unit 10 where the LED 4 is formed as shown in FIG. 9. Then, by the light converging lenses 16, the light from the LED 4 is converged in one direction. In addition, in front of the light converging lenses 16, a lenticular lens 18 is provided. With this configuration, lights emitted from each LED pair 5 (left-eye LED 4a, right-eye LED 4b) are transmitted through the light converging lenses 16, and converged in one direction. Subsequently, the converged lights are transmitted through the lenticular lens 18. Light 12 emitted from the left-eye LED 4a enters only a left eye 23 of a viewer by the effect of the lenticular lens, and light 14 emitted from the right-eye LED 4b enters only a right eye 25 of the viewer by the effect of the lenticular lens. Therefore, the left eye perceives only a left-eye image (the light 12 from the left-eye LED 4a), and the right eye perceives only a right-eye image (the light 14 from the right-eye LED 4b). As a result, the viewer recognizes a three dimensional image through the effect of binocular parallax.

It should be noted that, in the case of using the lenticular lens 18, the light 12 from the left-eye LED 4a and the light 14 from the right-eye LED 4b intersect each other prior to entering the eyes of the viewer respectively. Therefore, when the left-eye LED array 6 is positioned on the right side of the LED unit 10 (the side facing the right eye 25 of the viewer), light from the left-eye LED array 6 enters the left-eye 23. On the other hand, when the right-eye LED array 8 is positioned on the left side (the side facing the left eye 23 of the viewer), light from the right-eye LED array 8 enters the right eye 25. Hence, when using the lenticular lens 18, it is necessary to provide the left-eye LED array 6 on the right side of the LED unit 10 (the side facing the right eye 25 of the viewer), and to provide the right-eye LED array 8 on the left side (the side facing the left eye 23 of the viewer).

Furthermore, a parallax barrier can be used instead of the lenticular lens 18. In this case, the lenticular lens 18 and the light converging lenses 16 are not required. A parallax barrier with slits made at predetermined intervals therein is positioned in front of each LED pair 5 (left-eye LED 4a, right-eye LED 4b). When a viewer views the display screen, the left eye 23 is prevented by the parallax barrier from viewing the light from the right-eye LED 4b, and the right eye 25 is prevented by the parallax barrier from viewing the light from the left-eye LED 4a. This causes the left eye 23 to perceive only a left-eye image (the light 12 from the left-eye LED 4a) and causes the right eye 25 to perceive only a right-eye image (the light 14 from the right-eye LED 4b), whereby the viewer recognizes a three dimensional image.

(Additional Display of Images)

The above described such configurations as those displaying three dimensional images on the inner side face of the display section 28. In addition, the images can also be displayed on the inner top face (ceiling) and the inner bottom face (floor, ground) of the display section 28. The configuration is specifically described below. First, in order to display an image also on the inner top face and the inner bottom face of the display section 28, LED units 10 are provided on the top face and the bottom face respectively. Each of the LED units 10 is positioned in such a manner as to face inside of the display section 28. Then, each of the LED units 10 is rotated around the central axis of the display section 28 as the rotation axis. This makes it possible to display the image also on the inner top face and the inner bottom face of the display section 28 by using an afterimage effect. This configuration allows the image to be displayed on all areas surrounding a viewer, thereby making it possible to provide a high degree of realistic sensation.

Both images displayed on the top face and the bottom face of the display section 28 are displayed two dimensionally, and not three dimensionally. Thus, the combination of the images on the top face and the bottom face with the three dimensional image on a screen enables the viewer to view an image as a whole with higher realistic sensation and deeper immersion.

Furthermore, if the image is displayed in such a manner that the position of a floor or a ground in the image displayed on the inner side face of the display section 28 match the position of the inner bottom face (floor) of the display section 28, it causes the viewer to feel as if the floor or the ground in the image and the floor underneath the viewer were connected continuously. This gives the viewer the illusion as if the viewer himself/herself were present in the image displayed.

Also, if the image of the floor or the ground in the image displayed on the side face of the display section 28 is also displayed on the bottom face, it enhances the realistic sensation even further.

Embodiment 2

(Summary of Laser Scanning Device 15)

Figure 10:
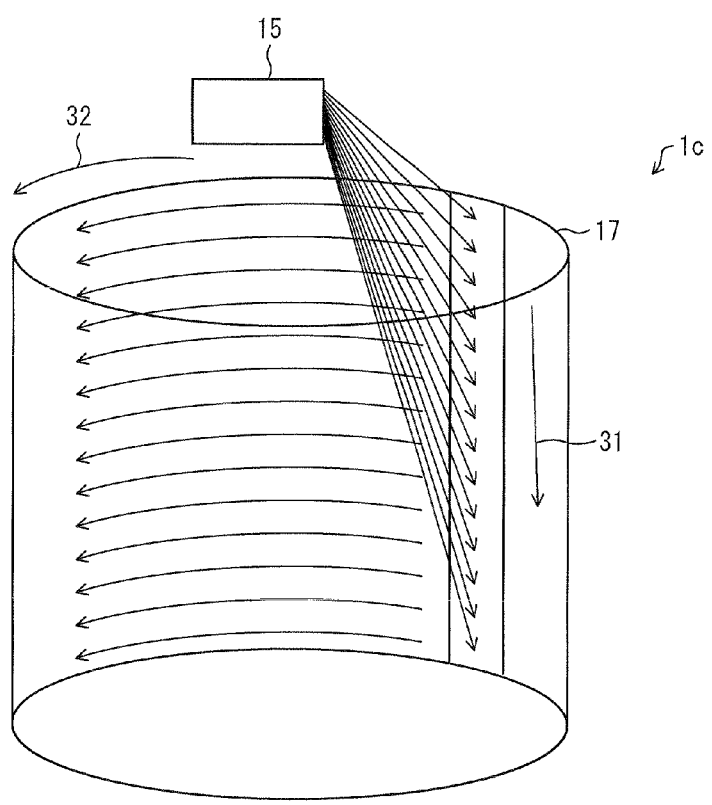
FIG. 10 is a view schematically showing a three dimensional video display device in accordance with one embodiment of the present invention.

The summary of a three dimensional video display device 1c according to the embodiment 2 of the present invention is described with reference to FIG. 10. FIG. 10 is a view schematically showing the three dimensional video display device 1c according to the present embodiment.

The three dimensional video display device 1c according to the present embodiment is obtained by partially modifying the embodiment 1. In the embodiment 1, an afterimage effect produced by rotating the LED units 10 along the top and bottom edges of the display section 28 is used. On the other hand, in the present embodiment, a three dimensional image is displayed on the screen by using laser scanning. Specifically, as shown in FIG. 10, an image is projected on a cylindrical screen 17 from a laser scanning device 15. A viewer views the image from within the screen 17.

The screen 17 is positioned around a predetermined central axis which is not illustrated. The laser scanning device 15 is constituted by a left-eye image projecting section (left-eye image display section), which is not illustrated, and by a right-eye image projecting section (right-eye image display section), which is also not illustrated. While the left-eye image projecting section projects a left-eye image on the screen 17, the right-eye image projecting section projects a right-eye image on the screen 17. More specifically, the left-eye image projecting section projects, one by one in a vertical direction (the direction of an arrow 31 in FIG. 10), a plurality of left-eye pixel columns constituting the left-eye image, at positions which correspond to projected ones of the left-eye pixel columns and which are away by a fixed distance from the central axis. At the same time, the left-eye image projecting section projects, along a circumferential direction of the cylinder (the direction of an arrow 32 in FIG. 10), left-eye pixel rows corresponding to a predetermined amount of dot lines. By repeating this successive projecting motion in series, left-eye images can be displayed on the screen 17 in turn at fixed intervals. On the other hand, the right-eye image projecting section projects, one by one in the vertical direction (the direction of the arrow in FIG. 10), a plurality of right-eye pixel columns constituting the right-eye image, at positions which correspond to projected ones of the right-eye pixel columns and which are away by a fixed distance from the central axis. At the same time, the right-eye image projecting section projects, along the circumferential direction of the cylinder (the direction of the arrow 32 in FIG. 10), the left-eye pixel rows corresponding to a predetermined amount of dot lines. By repeating this successive projecting motion in series, right-eye images can be displayed on the screen 17 in turn at fixed intervals.

Both the left-eye image projecting section and the right-eye image projecting section are configured to be capable of emitting laser beams in any of 360° directions. Specifically, both sections are configured to have emitting apertures that are 360° rotatable, for example.

The following is the description of the method for projection by the laser scanning device 15. The laser scanning device 15 vertically (the direction of the arrow 31 in FIG. 10) projects, on the screen 17, the left-eye image from the left-eye image projecting section. At the same time, the laser scanning device 15 projects, in the circumferential direction of the screen 17 (the direction of the arrow 32 in FIG. 10), the left-eye image corresponding to a predetermined amount of dot lines. Likewise, the laser scanning device 15 vertically (the direction of the arrow 31 in FIG. 10) projects, on the screen 17, the right-eye image from the right-eye image projecting section. At the same time, the laser scanning device 15 projects, in the circumferential direction of the screen 17 (the direction of the arrow 32 in FIG. 10), the right-eye image corresponding to a predetermined amount of dot lines. In so doing, the left-eye image and the right-eye image are projected in such a manner as to be adjacent to each other. Then, the laser scanning device 15 shifts its orientation and vertically projects, on the screen 17, images from the image projecting sections respectively just as earlier. It should be noted that a left-eye image to be projected by the left-eye image projecting section should not overlap with the right-eye image projected by the right-eye image projecting section in the previous time. By repeating this motion, the images are displayed all over the screen 17 in all directions.

When scanning light for displaying a column of a pixel group is projected sixty times or more per second at one place, it prevents flickering. Therefore, in the case of using two image projecting sections one for the left eye and one for the right eye, each image projecting section should emit laser light at a speed of projecting a column of the scanning light sixty times per second. Also, there may be plural sets of image projecting sections for the left eye and the right eye.

(Method for Displaying Three Dimensional Image)

The method for displaying, as a three dimensional image, an image projected by the laser scanning device 15 to a viewer is described. As described above, the laser scanning device 15 is constituted by the left-eye image projecting section and the right-eye image projecting section. The left-eye image projecting section projects a left-eye image, and the right-eye image projecting section projects a right-eye image. On this occasion, laser light from the left-eye image projecting section and laser light from the right-eye image projecting section are emitted with respective polarizations orthogonal to each other. For example, laser light polarized 45° to the left is emitted from the left-eye image projecting section, and laser light polarized 45° to the right is emitted from the right-eye image projecting section.

A viewer wears polarized glasses configured such that a polarizing plate having a polarizing axis of the laser light from the left-eye image projecting section is provided on the left lens, and a polarizing plate having a polarizing axis of the laser light from the right-eye image projecting section is provided on the right lens. This allows a left eye 23 of the viewer to receive only reflected light of the laser light emitted from the left-eye image projecting section, and allows a right eye 25 to receive only reflected light of the laser light emitted from the right-eye image projecting section. Therefore, the left eye 23 perceives only a left-eye image, and the right eye 25 perceives only a right-eye image, whereby the viewer recognizes a three dimensional image.

In the above configuration, the laser lights from the respective image projecting sections are polarized so that respective polarizations are orthogonal to each other. Alternatively, each of the image projecting sections can be configured to emit circularly polarized light. For example, the left-eye image projecting section emits left-handed circularly polarized light, and the right-eye image projecting section emits right-handed circularly polarized light. The viewer wears polarized glasses configured such that a left-handed circularly polarizing plate is provided on the left lens, and a right-handed circularly polarizing plate is provided on the right lens. This allows the left eye 23 to receive only the left-handed circularly polarized light emitted from the left-eye image projecting section, and allows the right eye 25 to receive only the right-handed circularly polarized light emitted from the right-eye image projecting section. Therefore, the left eye 23 perceives only a left-eye image, and the right eye 25 perceives only a right-eye image, whereby the viewer recognizes a three dimensional image.

In the present embodiment, a laser scanning element from the laser scanning device 15 is used as a display element. Alternatively, a projecting device constituted by other display elements such as a liquid crystal element, an organic EL element, or an LED can be used as long as the projecting device can emit light on the screen 17 to project an image.

(Image Display Region)

Also in the present embodiment, an image may be displayed on a top surface (ceiling) and a bottom surface (floor, ground) of the space surrounded by the screen 17. In the case of displaying the image on the top surface and the bottom surface, the image is projected on the top surface and the bottom surface by the laser scanning device 15 as with the case of displaying the image on the side face of the screen 17. These images are displayed two dimensionally instead of three dimensionally. Thus, the combination of the images on the top surface and the bottom surface with the three dimensional image on the screen 17 enables a viewer to view the image as a whole with higher realistic sensation and deeper immersion.

Figure 11:
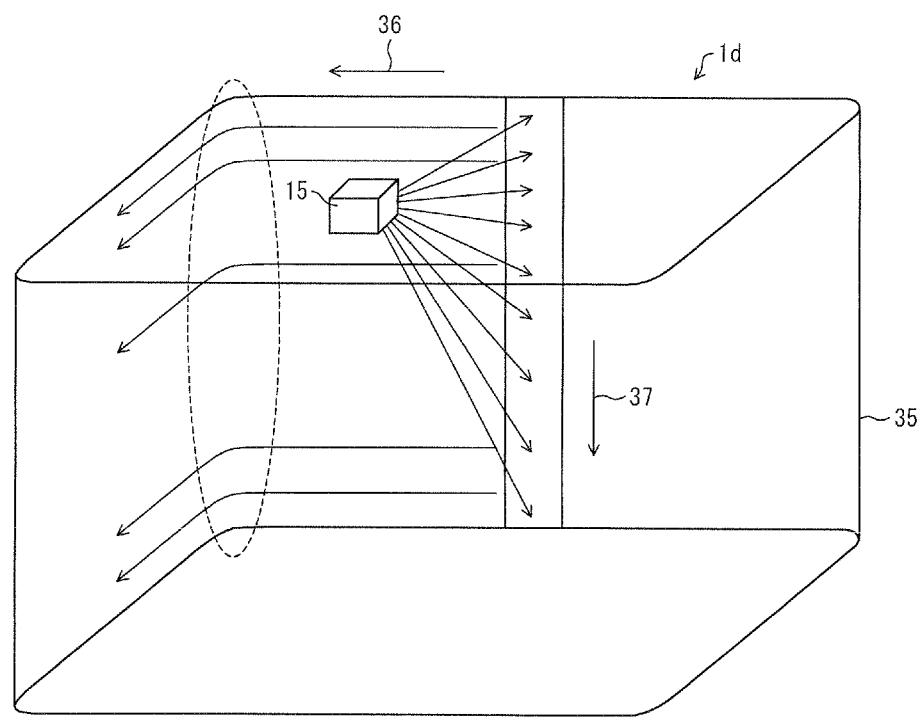
FIG. 11 is a view schematically showing a three dimensional video display device in accordance with one embodiment of the present invention.

It should be noted that, although the above described such a configuration that the screen 17 has a cylindrical shape, the shape of a screen is not necessarily limited to this shape. Instead of the cylindrical screen 17, for example, a screen having a quadrilateral tube shape such as square or rectangle can be used. FIG. 11 shows, as an example, a three dimensional video display device provided with a screen having a quadrilateral tube shape.

As shown in FIG. 11, the three dimensional video display device of the present invention may be a three dimensional video display device 1d provided with a screen 35 having a quadrilateral tube shape, instead of the screen 17 having a cylindrical shape. Then, a laser scanning device 15 vertically (the direction of an arrow 37 in FIG. 11) projects a left-eye image and a right-eye image from image projecting sections respectively. At the same time, the laser scanning device 15 projects, along the edges of the screen 35 (the direction of an arrow 36 in FIG. 11), a left-eye image corresponding to a predetermined amount of dot lines. Then, the laser scanning device 15 shifts its orientation and vertically projects, on the screen 35, images from the image projecting sections respectively. By repeating this motion, the images are displayed all over the screen 35 in all directions.

As long as the laser scanning device 15 can project a three dimensional image (a left-eye image and a right-eye image) as described above, the screens 17 and 35 may have any shape. Therefore, not only a screen having a cylindrical or quadrilateral tube shape but also a screen having a polygonal tube shape can be used in the three dimensional video display device 1c according to the present embodiment.

It should be noted that, since the screen 35 of the three dimensional video display device 1d has a quadrilateral tube shape, the image in the four corners (such as a section circled by the dotted line in the view) can be deformed or blurred. Thus, in order to prevent the deformation or blurring of the images, it is desirable to make, on the images projected on the four corners, treatments such as performing image processing and image conversion, and adjusting the optical system etc. prior to the projection.

The present invention is not limited to the description of the embodiments above, but may be altered by a skilled person within the scope of the claims. An embodiment based on a proper combination of technical means disclosed in different embodiments is encompassed in the technical scope of the present invention.

Summary of Embodiments

As described above, the three dimensional video display device according to the present invention is further arranged such that the left-eye image display section and the right-eye image display section (a) each include a plurality of display elements aligned in a column and (b) are aligned adjacently to each other to constitute a display unit, the three dimensional video display device further including a rotation mechanism that rotates the display unit in a direction in which the plurality of left-eye columns and the plurality of right-eye columns are aligned.

With the above configuration, the three dimensional video display device displays a three dimensional image on the circumference of the central axis by, while rotating the display unit with the rotation mechanism, displaying the left-eye pixel columns and the right-eye pixel columns one by one. Therefore, a highly realistic three dimensional image can be displayed with the simple configuration.

Additionally, it is preferable to arrange the three dimensional video display device according to the present invention so as to further include a hollow housing which has a plurality of the display units therein, and which can be suspended in the air, the rotation mechanism rotating the housing in a circumferential direction around the central axis while suspending the housing in the air.

With the above configuration, the rotation mechanism for rotating each display unit does not need to be provided at the central axis in the housing. Thus, a viewer can use the space inside the housing without being crammed.

Furthermore, it is preferable to arrange the three dimensional video display device according to the present invention so as to further include: an operating driver, provided on a back or a side face of a surface of the left-eye image display section on which surface the plurality of display elements are provided, the operating driver operating the left-eye image display section; and an operating driver, provided on a back or a side face of a surface of the right-eye image display section on which surface the plurality of display elements are provided, the operating driver operating the right-eye image display section.

With the above configuration, each display section can be easily operated without blocking light from each display section.

Furthermore, it is preferable to arrange the three dimensional video display device according to the present invention so as to further include a lenticular lens provided on a light exit plane of the display unit.

Furthermore, it is preferable to arrange the three dimensional video display device according to the present invention so as to further include a left-handed circularly polarizing plate provided on the surface of the left-eye image display section on which surface the plurality of display elements are provided; and a right-handed circularly polarizing plate provided on the surface of the right-eye image display section on which surface the plurality of display elements are provided.

Furthermore, it is preferable to arrange the three dimensional video display device according to the present invention so as to further include a hollow screen having a tube shape, which is positioned in such a manner as to center on the central axis, the left-eye image display section displaying an image by projecting the left-eye pixel columns on the screen; and the right-eye image display section displaying an image by projecting the right-eye pixel columns on the screen.

The above configuration allows the three dimensional video display device to display, on a screen having a tube shape, a highly realistic three dimensional image.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A three dimensional video display device according to the present invention can be used, for example, for entertainments, medical fields, and electronic catalogs/advertisements etc.

REFERENCE SIGNS LIST 1, 1a-1d Three dimensional video display device
4 LED
4a Left-eye LED
4b Right-eye LED
5 LED pair
6 Left-eye LED array
7 Wheel
8 Right-eye LED array
9 Wheel
10 LED unit
11 Operating driver
12 Light from left-eye LED
13 Operating driver
14 Light from right-eye LED
15 Laser scanning device
16 Light converging lens
17, 35 Screen
18 Lenticular lens
19, 21 Left-handed circularly polarizing plate
20, 22 Right-handed circularly polarizing plate
23 Left eye
24, 26, 34 Direction of rotation
25 Right eye
27 Support plate
28, 29, 33 Display section
30 Rotation mechanism
31, 37 Direction of scanning light beam (vertical direction on cylinder)
32, 36 Direction of scanning light beam (circumferential direction of cylinder)

The invention claimed is:

1. A three dimensional video display device for displaying a three dimensional image constituted by a left-eye image and a right-eye image, comprising:
   a left-eye image display section for displaying, one by one at fixed intervals, a plurality of left-eye pixel columns constituting the left-eye image, at positions which correspond to displayed ones of the plurality of left-eye pixel columns and which are away by a predetermined distance from a predetermined central axis; and
   a right-eye image display section for displaying, one by one at fixed intervals, a plurality of right-eye pixel columns constituting the right-eye image, at positions which correspond to displayed ones of the plurality of right-eye pixel columns and which are away by the predetermined distance from the predetermined central axis;
   the left-eye image display section and the right-eye image display section (a) each include a plurality of display elements aligned in a column and (b) are aligned adjacently to each other to constitute a display unit,
   the three dimensional video display device further comprising a rotation mechanism that rotates the display unit in a direction in which the plurality of left-eye pixel columns and the plurality of right-eye pixel columns are aligned.

2. The three dimensional video display device as set forth in claim 1, further comprising a hollow housing which has a plurality of the display units therein, and which can be suspended in the air,
   the rotation mechanism rotating the housing in a circumferential direction around the central axis while suspending the housing in the air.

3. The three dimensional video display device as set forth in claim 1, further comprising:
   an operating driver, provided on a back or a side face of a surface of the left-eye image display section on which surface the plurality of display elements are provided, the operating driver operating the left-eye image display section; and
   an operating driver, provided on a back or a side face of a surface the right-eye image display section on which surface the plurality of display elements are provided, the operating driver operating the right-eye image display section.

4. The three dimensional video display device as set forth in claim 1, further comprising a lenticular lens provided on a light exit plane of the display unit.

5. The three dimensional video display device as set forth in claim 1, further comprising:
   a left-handed circularly polarizing plate provided on the surface of the left-eye image display section on which surface the plurality of display elements are provided; and
   a left-handed circularly polarizing plate provided on the surface of the right-eye image display section on which surface the plurality of display elements are provided.

6. A three dimensional video display device for displaying a three dimensional image constituted by a left-eye image and a right-eye image, comprising:
   a left-eye image display section for displaying, one by one at fixed intervals, a plurality of left-eye pixel columns constituting the left-eye image, at positions which correspond to displayed ones of the plurality of left-eye pixel columns and which are away by a predetermined distance from a predetermined central axis; and
   a right-eye image display section for displaying, one by one at fixed intervals, a plurality of right-eye pixel columns constituting the right-eye image, at positions which correspond to displayed ones of the plurality of right-eye pixel columns and which are away by the predetermined distance from the predetermined central axis;
   a hollow screen having a tube shape, which is positioned in such a manner as to center on the central axis,
   the left-eye image display section displaying an image by projecting the left-eye pixel columns on the screen;

the left-eye image display section scanning each of the left-eye pixel columns in a vertical direction of the screen;

the right-eye image display section displaying an image by projecting the right-eye pixel columns on the screen; and the right-eye image display section scanning each of the right-eye pixel columns in a circumferential direction of the screen.

\* \* \* \* \*